US 9,102,325 B2

(12) United States Patent
Jung

(10) Patent No.: US 9,102,325 B2
(45) Date of Patent: Aug. 11, 2015

(54) HYBRID ELECTRIC VEHICLE AND METHOD OF CONTROLLING DRIVING OF THE SAME

(71) Applicants: Hyundai Motor Company, Seoul (KR); Kia Motors Corporation, Seoul (KR)

(72) Inventor: Hyun Woo Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 111 days.

(21) Appl. No.: 13/711,266

(22) Filed: Dec. 11, 2012

(65) Prior Publication Data

US 2014/0100729 A1 Apr. 10, 2014

(30) Foreign Application Priority Data

Oct. 5, 2012 (KR) .......................... 10-2012-0110945

(51) Int. Cl.
*B60W 20/00* (2006.01)
*B60W 10/02* (2006.01)
(Continued)

(52) U.S. Cl.
CPC ............... *B60W 20/40* (2013.01); *B60W 10/02* (2013.01); *B60W 10/08* (2013.01); *B60W 10/30* (2013.01);
(Continued)

(58) Field of Classification Search
CPC .............. Y02T 10/144; Y02T 10/6252; Y02T 10/7005; Y02T 10/6295; B60W 20/00; B60W 10/06; B60W 10/08; B60W 20/40; B60W 10/02; B60W 10/30; B60W 2600/00; B60W 2710/0683; B60Y 2400/435; B60Y 2400/46; B60Y 2300/51; F02D 41/042; F02D 41/0007; F02N 11/003; F02N 11/04; Y10S 903/93; B60K 2006/4825; F02B 37/10; F02B 39/10; F02B 39/12; H02J 7/14
USPC ........................................................... 701/22
See application file for complete search history.

(56) References Cited

U.S. PATENT DOCUMENTS 6,183,389 B1 * 2/2001 Tabata ............................... 477/5
2010/0106394 A1 * 4/2010 Seufert et al. .................. 701/113
(Continued)

FOREIGN PATENT DOCUMENTS

JP 2008-095669 A 4/2008
KR 1020010071191 A 7/2001
(Continued)

OTHER PUBLICATIONS

KR1020100003001, Kim et al. (Jul. 2010) (Machine Translation).*

*Primary Examiner* — Fadey Jabr
*Assistant Examiner* — Courtney Heinle
(74) *Attorney, Agent, or Firm* — Mintz Levin Cohn Ferris Glovsky and Popeo, P.C.; Peter F. Corless

(57) ABSTRACT

Provided is a hybrid electric vehicle that includes a turbocharger and a method for controlling driving of the hybrid electric vehicle accordingly. In particular, an engine and a motor are configured to generate power respectively. An engine clutch may be positioned between the engine and the driving motor to engage and disengage the engine and the driving motor. An integrated starter and generator (ISG) starts the engine or generates power, and a turbocharger is provided therein. A decelerator adjusts revolution speeds and torque of the turbine and the air compressor of the turbocharger and the integrated starter and generator between the turbine and the air compressor of the turbocharger and the integrated starter and generator. Finally, a controller controls the integrated starter and generator, the engine clutch, the turbo charter, and the decelerator based on states of the engine, the driving motor, and the battery accordingly.

9 Claims, 9 Drawing Sheets

(51) Int. Cl.
| | |
|---|---|
| *B60W 10/08* | (2006.01) |
| *B60W 10/30* | (2006.01) |
| *F02D 41/04* | (2006.01) |
| *F02D 41/00* | (2006.01) |
| *F02N 11/00* | (2006.01) |
| *F02N 11/04* | (2006.01) |
| *B60K 6/48* | (2007.10) |
| *F02B 37/10* | (2006.01) |
| *H02J 7/14* | (2006.01) |
| *F02B 39/10* | (2006.01) |
| *F02B 39/12* | (2006.01) |

(52) U.S. Cl.
CPC .......... *F02D 41/0007* (2013.01); *F02D 41/042* (2013.01); *F02N 11/003* (2013.01); *F02N 11/04* (2013.01); *B60K 2006/4825* (2013.01); *B60W 2600/00* (2013.01); *B60W 2710/0683* (2013.01); *B60Y 2300/51* (2013.01); *B60Y 2400/435* (2013.01); *B60Y 2400/46* (2013.01); *F02B 37/10* (2013.01); *F02B 39/10* (2013.01); *F02B 39/12* (2013.01); *H02J 7/14* (2013.01); *Y02T 10/144* (2013.01); *Y02T 10/6252* (2013.01); *Y02T 10/6295* (2013.01); *Y02T 10/7005* (2013.01); *Y10S 903/93* (2013.01)

(56) References Cited

U.S. PATENT DOCUMENTS

| | | | |
|---|---|---|---|
| 2012/0329603 A1* | 12/2012 | Yamazaki et al. | 477/3 |
| 2013/0184914 A1* | 7/2013 | Sujan et al. | 701/22 |
| 2013/0296107 A1* | 11/2013 | Nedorezov et al. | 477/5 |

FOREIGN PATENT DOCUMENTS

| | | |
|---|---|---|
| KR | 1020080053819 A | 6/2008 |
| KR | 1020100003001 A | 1/2010 |
| KR | 10-2012-0102652 | 9/2012 |

* cited by examiner

HYBRID ELECTRIC VEHICLE AND METHOD OF CONTROLLING DRIVING OF THE SAME

CROSS-REFERENCE TO RELATED APPLICATION

This application claims priority to and the benefit of Korean Patent Application No. 10-2012-0110945 filed in the Korean Intellectual Property Office on Oct. 5, 2012, the entire contents of which are incorporated herein by reference.

BACKGROUND (a) Field of the Invention

The present invention relates to a hybrid electric vehicle including a turbocharger and a method of controlling driving of the hybrid electric vehicle.

(b) Description of the Related Art

A turbocharger is a forced induction device used to allow more power to be produced for an internal combustion engine of a given size. A turbocharged engine can be more powerful and efficient than a naturally aspirated engine because a turbine forces more intake air, and proportionately more fuel, into the combustion chamber than if atmospheric pressure alone is used.

Turbochargers were originally created for aircraft engines, but in the last few decades have been integrated into vehicular platforms do to their increased energy efficiency. Since turbochargers are easily and simply mounted to a diesel engine, turbochargers have begun to be mounted a plethora of mass-produced diesel vehicles.

Additionally, as demands for a vehicle having improved fuel efficiency increase worldwide, downsizing of even a reduced sized engine displacement has become popular, and as a result, turbochargers have become popular in gasoline vehicles as well.

The efficiency of the engine is determined based upon various factors. In particular, the efficiency of the engine may be determined based on the amount of oxygen provided by intake air flowing into the engine. Accordingly, in order to increase the efficiency of the engine, it is necessary to compress intake air as must as possible, and to this end, the turbocharger is used.

A turbocharger compresses the intake air by utilizing exhaust air discharged from the engine. The exhaust air drives the turbocharger to be discharged to the outside. When the engine rotates at a higher speeds, the exhaust air further includes a large amount of energy even after sufficiently driving the turbocharger. Accordingly, various methods have been researched in order to utilize this energy included in the exhaust air.

Although, turbochargers improve performance of the engine, it is not easy to exhibit the advantageous effects of turbochargers at low speeds and low torque in which the amount of exhaust gas is greatly decreased due to the use of kinetic energy of the exhaust gas.

Furthermore, since oil prices have greatly increased and exhaust gas regulations have become stricter, eco-friendly vehicles and fuel efficiency improvement have been the focus in the development of most vehicles. Accordingly, vehicle makers have made an effort to develop a technology for reducing fuel consumption and decreasing exhaust gas in order to meet eco-friendly regulations and improve fuel efficiency.

Under the above circumstances, the vehicle makers have particularly focused much interest and effort in hybrid electric vehicle (HEV) technology which efficiently combines and uses power of an engine and power of a motor in order to achieve high fuel efficiency.

Hybrid electric vehicles have met purchase demands of many customers due to their high fuel efficiency and eco-friendly image. FIG. 1 illustrates a conceptual configuration of a hybrid electric vehicle.

Referring to FIG. 1, the hybrid electric vehicle may include an engine 10, a driving motor 20, an engine clutch 30 that engages or disengages power between the engine 10 and the driving motor 20, a transmission 40, a differential gear 50, a battery 60, a starting/generating motor 70 that starts the engine 10 or generates power to charge the battery via output from the engine 10, and/or wheels 80.

Further, a hybrid electric vehicle may include a hybrid control unit (HCU) (i.e., a type of controller that includes a processor and a memory) for controlling the entire operation of the hybrid electric vehicle and a battery control unit (BCU) 120 (i.e., also another type of controller that includes its own processor and memory) for managing and controlling the battery 60. The battery control unit 120 may be called a battery management system (BMS). Furthermore, the starting/generating motor 70 may be called an integrated starter and generator (ISG) or a hybrid starter and generator (HSG) in this field of art.

The driving modes of the hybrid electric vehicle may be an electric vehicle (EV) mode, which is a mode in which only power from the driving motor 20 is supplied to the transmission. In a hybrid electric vehicle (HEV) mode, torque from the driving motor 20 is utilized as auxiliary power while using torque of the engine 10 utilized as main power in most hybrid applications. Finally, in a regenerative braking (RB) mode brake and inertia energy is collected through generation from the driving motor 20 to charge the battery 60 during braking or driving using the inertia of the vehicle.

As described above, the hybrid electric vehicle uses mechanically both energy from the engine and electric energy from the battery, uses an optimum operation region of the engine and the driving motor, and collects the energy using the driving motor while braking, thereby improving fuel efficiency and efficiently using the energy.

However, hybrid electric vehicles do not typically include a turbocharger, so that there is a chance to improve fuel efficiency, if a configuration could be found to properly implement the turbocharger into these types of vehicles. However, in the past, the pressure from the exhaust has been insufficient to properly operate a turbocharger.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a hybrid electric vehicle including a turbocharger which improves engine efficiency and engine performance as well as fuel efficiency by mounting a turbocharger to the hybrid electric vehicle, and a method of controlling driving of the hybrid electric vehicle.

Further, the present invention has been made in an effort to provide a hybrid electric vehicle including a turbocharger that improves functions of a turbocharger by an integrated starter and generator of the hybrid electric vehicle, and a method of controlling driving of the hybrid electric vehicle.

An exemplary embodiment of the present invention provides a hybrid electric vehicle, including: an engine configured to generate power via fuel being injected therein; a driving motor configured to generate power via receiving power from a battery; an engine clutch positioned between the engine and the driving motor to engage and disengage the engine and the driving motor; an integrated starter and generator (ISG) configured to start the engine or perform power generation; a turbocharger including a turbine rotated by exhaust gas introduced in an exhaust manifold and an air compressor configured to compress air via torque from the turbine to transfer the compressed air to an air intake of the engine; and a decelerator configured to adjust revolution speeds and torque of the turbocharger and the integrated starter and generator between the turbocharger and the integrated starter and generator.

Another exemplary embodiment of the present invention provides a hybrid electric vehicle, including: an engine configured to generate power via injecting fuel into the engine; a driving motor configured to generate power by receiving power from a battery; an engine clutch positioned between the engine and the driving motor to engage and disengage the engine and the driving motor; an integrated starter and generator (ISG) configured to start the engine or perform power generation; a turbocharger including a turbine rotated by exhaust gas introduced in an exhaust manifold and an air compressor configured to compress air via torque from the turbine to transfer the compressed air to an air intake of the engine; a decelerator configured to adjust revolution speeds and torque of the turbine and the air compressor of the turbocharger and the integrated starter and generator between the turbine and the air compressor of the turbocharger and the integrated starter and generator; and a controller (including a processor and a memory) configured to control the integrated starter and generator, the engine clutch, the turbocharger, and the decelerator based on states of the engine, the driving motor, and the battery.

The hybrid electric vehicle according to exemplary embodiment of the present invention may further include a starter and generator clutch configured to transfer the power from the engine to the integrated starter and generator or block the transference of the power from the engine to the integrated starter and generator.

The controller may be configured to transfer the torque of the integrated starter and generator to the air compressor of the turbocharger through the decelerator to rotate the air compressor when the engine is being started by the integrated starter and generator.

The controller may also be configured to control the starter and generator clutch so that the connection between the engine and the integrated starter and generator is blocked (i.e., disengaged) once the engine is started.

The controller may be configured to be controlled so that the torque of the turbine is transferred to the integrated starter and generator through the decelerator and the integrated starter and generator generates power via the torque of the turbine while rotating when the battery needs to be charged.

The controller may also be configured to control the starter and generator clutch so that the power of the engine is transferred to the integrated starter and generator and the power is generated also by the power from the engine when the amount of generated power from the integrated starter and generator by the torque of the turbine is insufficient to charge the battery.

The controller may disengage the clutch between the engine and the integrated starter and generator, and control the integrated starter and generator and the decelerator so that the torque of the integrated starter and generator is transferred to the air compressor through the decelerator and the amount of intake air supplied to the engine by the air compressor increases when the hybrid electric vehicle runs is operating below a predetermined speed and below a predetermined torque region or when the hybrid electric vehicle is accelerating, and the engine is connected with the integrated starter and generator.

The controller may also be configured to transfer the torque from the turbine to the integrated starter and generator through the decelerator when the hybrid electric vehicle is running at a fixed speed to charge the battery via power generation of the integrated starter and generator.

The controller may connect the engine and the integrated starter and generator and connect the integrated starter and generator and the air compressor through the decelerator during braking.

The controller may furthermore rotate the integrated starter and generator for a set period of time to force the decelerator, the turbine, and the air compressor radiate heat when the engine is stopped after the running of the hybrid electric vehicle.

Yet another exemplary embodiment of the present invention provides a method of controlling driving of a hybrid electric vehicle including: engine configured to generate power via fuel injected into the engine; a driving motor configured to generate power via receiving power from a battery; an engine clutch positioned between the engine and the driving motor to engage and disengage the engine and the driving motor; an integrated starter and generator, which serves as an integrated starter and generator for starting the engine or performing power generation, including a starter and generator clutch configured to engage and disengage the integrated starter and generator and the engine and; and a turbocharger including a turbine rotated via exhaust gas introduced in an exhaust manifold and an air compressor configured to compress air via torque of the turbine to transfer the compressed air to an air intake of the engine, the method including: transferring torque of the integrated starter and generator to the air compressor of the turbocharger through the decelerator to rotate the air compressor when the engine is started; and controlling the starter and generator clutch so as to block the connection between the engine and the integrated starter and generator after the engine is started.

According to the exemplary embodiments of the present invention, it is possible to improve performance of the turbocharger, improve engine efficiency and engine performance, and improve fuel efficiency by mounting the turbocharger to the hybrid electric vehicle.

Further, according to the exemplary embodiments of the present invention, it is possible to further improve a function of the turbocharger by the integrated starter and generator of the hybrid electric vehicle.

DETAILED DESCRIPTION OF THE EMBODIMENTS

Figure 1:
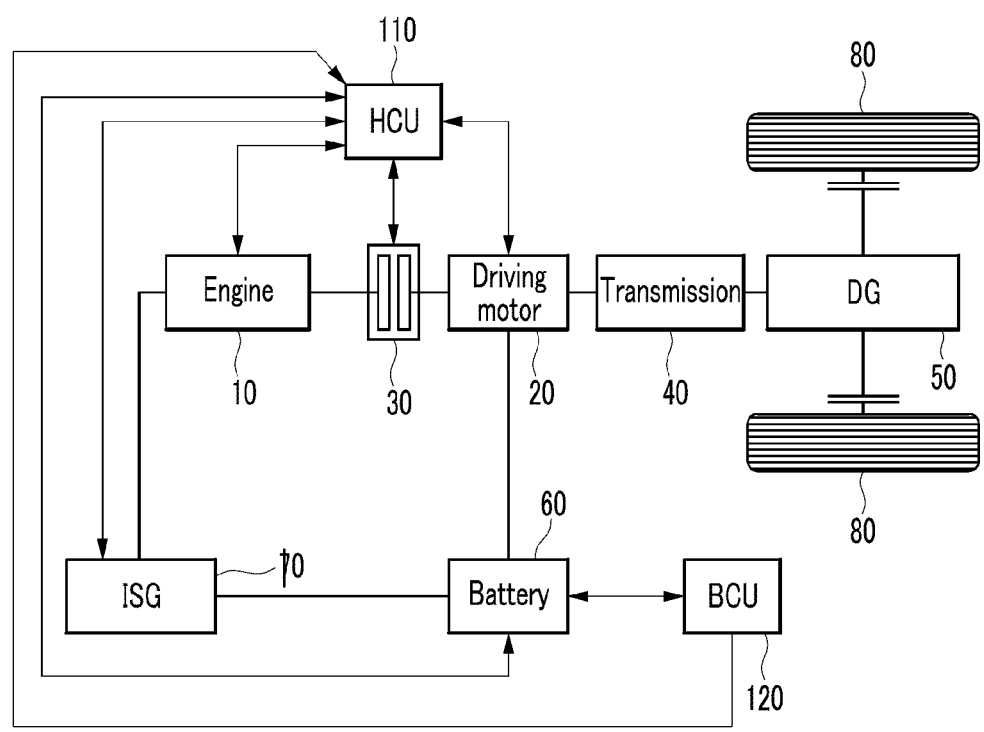
FIG. 1 is a configuration diagram of a hybrid electric vehicle according to an exemplary embodiment of the related art.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the specification, unless explicitly described to the contrary, the word "comprise" and variations such as "comprises" or "comprising," will be understood to imply the inclusion of stated elements but not the exclusion of any other elements. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
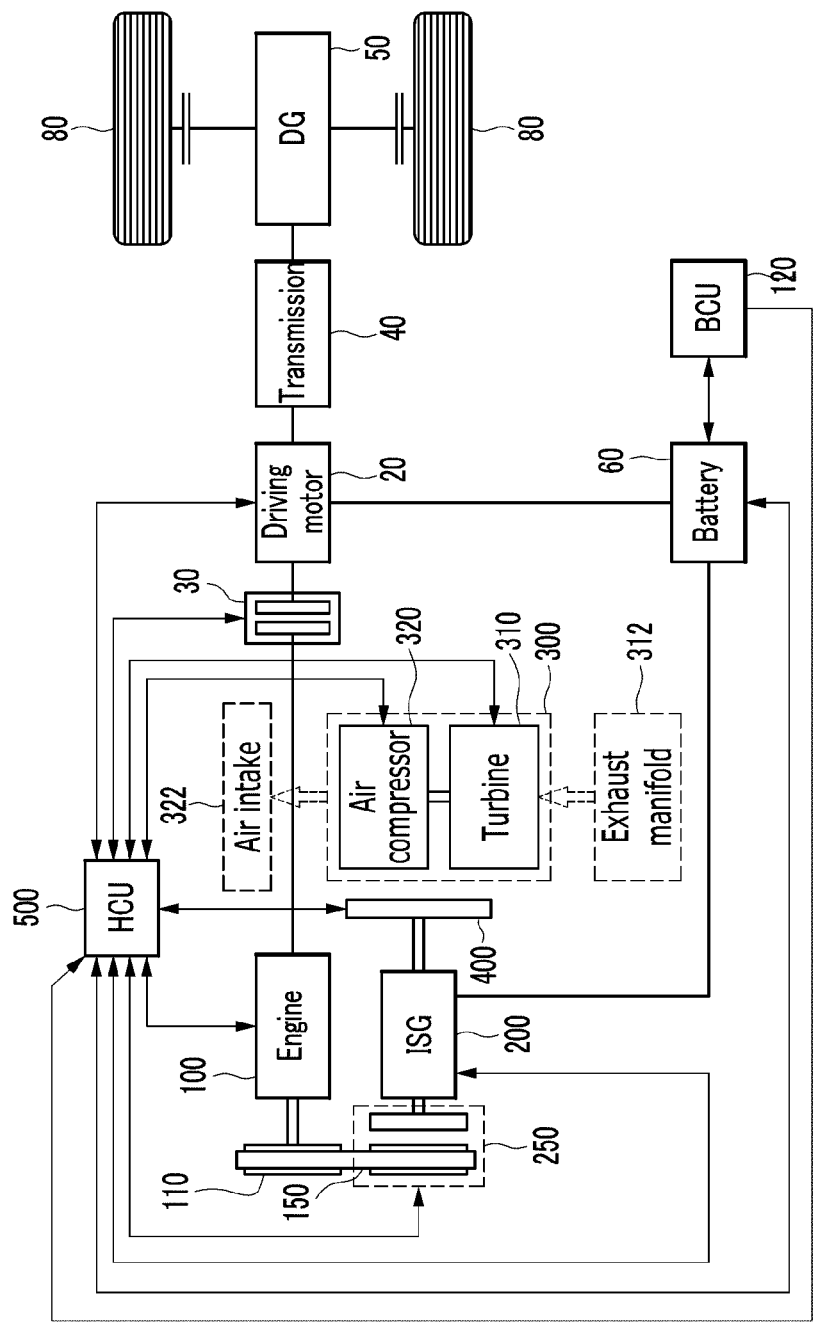
FIG. 2 is a configuration diagram of a hybrid electric vehicle including a turbocharger according to an exemplary embodiment of the present invention.

FIG. 2 is a block diagram schematically illustrating a hybrid electric vehicle according to an exemplary embodiment of the present invention. The hybrid electric vehicle according to the exemplary embodiment of the present invention is a hybrid electric vehicle that includes a turbocharger within its power train. The hybrid electric vehicle according to the exemplary embodiment of the present invention more specifically includes: an engine 100 that generates power via injecting fuel into the engine; a driving motor 20 that generates power via power from a battery 60; an engine clutch 30 positioned between the engine 100 and the driving motor 20 to engage the engine 100 and the driving motor 20 or disengage the connection of the engine 100 and the driving motor 20; an integrated starter and generator 200, which is an integrated starter and generator (ISG) 200 which starts the engine 100 or generates power accordingly, including a starter and generator clutch 250 that engages the engine 100 with the starter and generator or disengages the connection with the engine 100; a turbocharger 300 including a turbine 310 rotated by exhaust gas introduced in an exhaust manifold 312 and an air compressor 320 configured to compress air via torque from the turbine 310 to transfer the compressed air to an air intake 322 of the engine; a decelerator 400 configured to adjust revolution speeds and torque of the turbine 210 and the air compressor 320 of the turbocharger 300, and the integrated starter and generator 200 between the turbine 310 and the air compressor 320 of the turbocharger 300, and the integrated starter and generator 200; and a controller 500 configured to control the integrated starter and generator 200, the engine clutch 30, the turbocharger 300, and the decelerator 400 based on states of the engine 100, the driving motor 20, and the battery 60.

The driving motor 20, the engine clutch 30, and the battery 60 may be formed with those generally mounted to the hybrid electric vehicle, respectively.

The engine 100 is configured to receive compressed air from the turbocharger 300. Configurations and operations of the turbocharger 300 and the engine 100 receiving compressed air from the turbocharger 300 are well known, and thus detailed descriptions thereof will be omitted.

The decelerator 400 adjusts revolutions per minute of the turbine 310 and the air compressor 320 of the turbocharger 300 rotating at a higher speed than a speed of revolution of the integrated starter and generator 200. The revolutions per minute of the turbine 310 are, for example, 60,000 to 100,000 RPM.

The decelerator 400 in the exemplary embodiment of the present invention serves to increase the speed of revolution of the integrated starter and generator 200 when transferring torque of the integrated starter and generator 200 to the turbine 310 or the air compressor 320. On the contrary, the decelerator 400 decreases the speed of revolution of the turbine 310 or the air compressor 320 when transferring torque from the turbine 310 or the air compressor 320 to the integrated starter and generator 200.

The starter and generator clutch 250 is formed as a clutch that is installed in the integrated starter and generator 200 to apply power from the engine 100 transferred through a belt 150 to the integrated starter and generator 200 or block said power. The starter and generator clutch 250 may be formed as, for example, a magnet clutch engaged and disengaged according to the control of the controller 500 in the exemplary embodiment of the present invention, but it should be understood that the scope of the present invention is not limited thereto. If the starter and generator clutch 250 has a configuration capable of substantially transferring the power of the engine 100 to the integrated starter and generator 200 or blocking the transference of the power of the engine 100 to the integrated starter and generator 200, a technical spirit of the present invention will be applied thereto even though the configuration is different from the aforementioned configuration. One side of the belt 150 may be connected to a crankshaft 110 of the engine 100, and the other side thereof is connected to the starter and generator clutch 250.

The controller 500 is configured to control the turbocharger 300, the integrated starter and generator 200, the starter and generator clutch 250, the decelerator 400, the engine clutch 30, and the like of the hybrid electric vehicle according to a set program. The set program includes a series of commands for performing a method of controlling driving of a hybrid electric vehicle according to an exemplary embodiment of the present invention to be described below with reference to FIGS. 3 to 9.

Hereinafter, the hybrid electric vehicle and a method of controlling driving of a hybrid electric vehicle according to an exemplary embodiment of the present invention will be described in detail with reference to the accompanying drawings.

Figure 3:
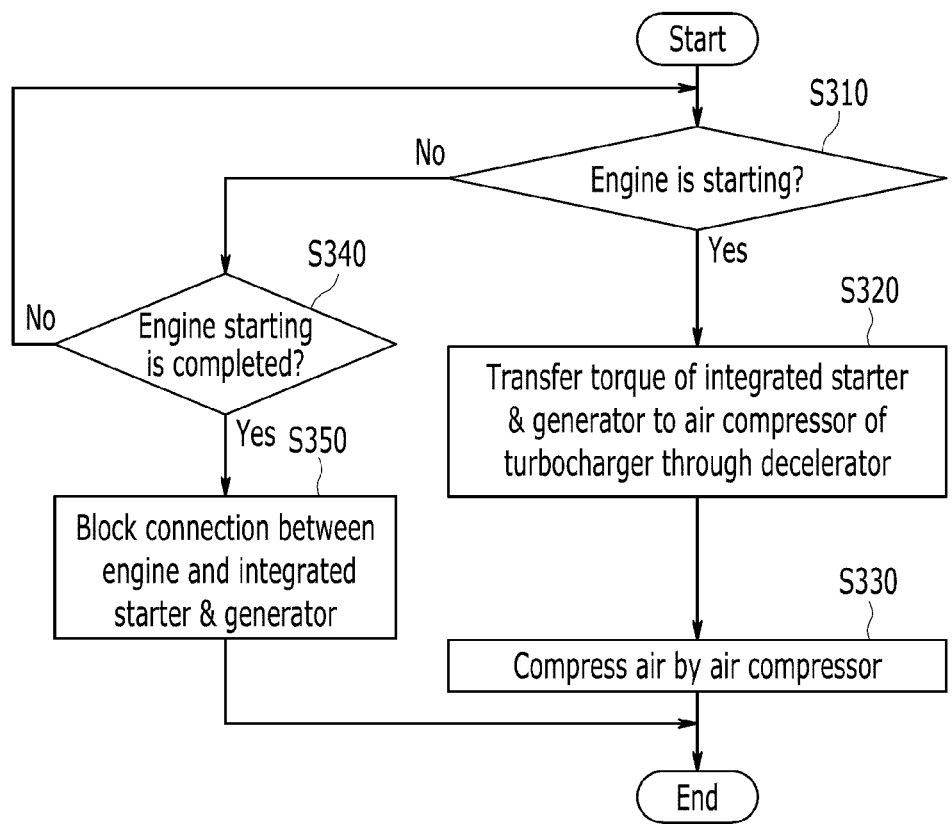
FIG. 3 is a flowchart of a method of controlling driving of a hybrid electric vehicle according to an exemplary embodiment of the present invention.

FIG. 3 is a flowchart illustrating a method of controlling driving of a hybrid electric vehicle applied to starting an engine of a hybrid electric vehicle according to an exemplary embodiment of the present invention.

Referring to FIG. 3, the controller 500 determines whether the engine 100 is starting through a position of a key switch or a signal of a starting button (S310). That is, the controller 500 determines whether the engine 100 is starting by the integrated starter and generator 200. When it is determined that the engine 100 is starting, the controller 500 controls the decelerator 400 so that a speed of revolutions of the integrated starter and generator 200 is increased through the decelerator 400 to be transferred to the air compressor 320 of the turbocharger 300 (S320).

When the torque of the integrated starter and generator 200 is transferred to the air compressor 200 by the decelerator 400, the air compressor 200 compresses the air and provides the compressed air to the air intake 322 of the engine 100 (S300). When the compressed air is provided to the air intake 322, engine efficiency may be improved and fuel consumption may be minimized while the engine is being started.

It is a matter of course that when the air compressor 320 compresses the air by the torque of the integrated starter and generator 200, the turbocharger 300 compresses the air according to an existing method. Once the engine 100 has been started (S340), the controller 500 releases the starter and generator clutch 250 to disengage the connection of the engine 100 and the integrated starter and generator 200 (S350).

Figure 4:
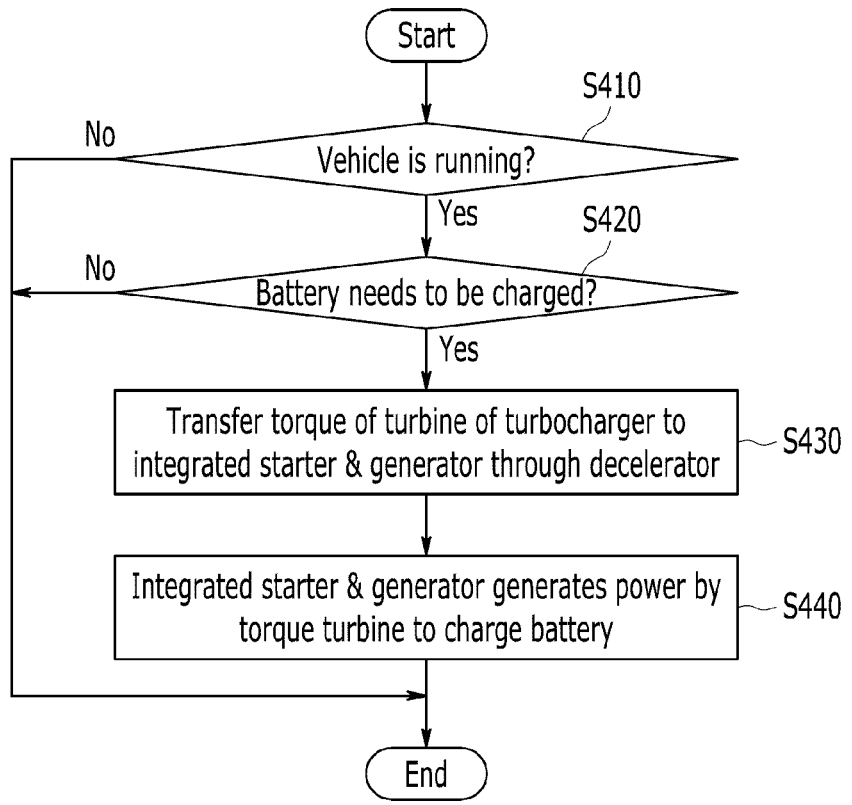
FIGS. 4 to 9 are flowcharts of a method of controlling driving of a hybrid electric vehicle according to another exemplary embodiment of the present invention, respectively.

FIG. 4 is a flowchart illustrating a method of controlling driving applied when the hybrid electric vehicle according to another exemplary embodiment of the present invention needs battery charging during the running Referring to FIG. 4, the controller 500 identifies whether it is necessary to charge the battery 60 during the operation (i.e., running) of the hybrid electric vehicle (S410 and S420). The controller 500 may determine whether the hybrid electric vehicle is running based on the operation of the engine 100 or a vehicle speed signal. The controller 500 may determine whether it is necessary to charge the battery 60 based on state of charge (SOC) information of the BCU 120.

When the hybrid electric vehicle is running and it is necessary to charge the battery 60, the controller 500 controls the decelerator 400 and the integrated starter and generator 200 so that torque of the turbine 310 rotated by the exhaust gas is transferred to the integrated starter and generator 200 through the decelerator 400 (S430).

When the torque of the turbine 310 is transferred to the integrated starter and generator 200 through the decelerator 400, the integrated starter and generator 200 generates power to charge the battery 60 (S440). That is, according to the exemplary embodiment of the present invention, the battery 60 is charged by kinetic energy of the exhaust gas.

Figure 5:
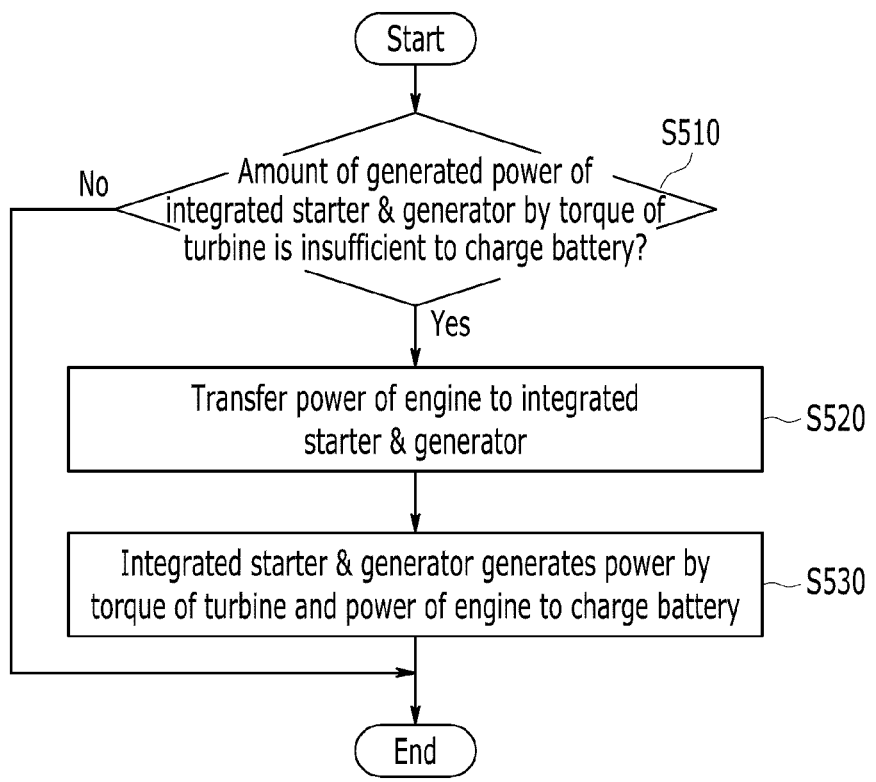

Also, the controller 500 determines whether the amount of generated power of the integrated starter and generator 200 by the torque of the turbine 310 is insufficient to charge the battery 60 during the running of the hybrid electric vehicle (S510; FIG. 5). That is, the controller 500 may determine that the amount of power generated by the integrated starter and generator 200 due to torque from the turbine 310 is insufficient to charge the battery 60 based on the SOC information on the BCU 120. When it is determined that the battery 60 is not charged to a desired charging state with the amount of generated power of the integrated starter and generator 200 by the torque of the turbine 310, the controller 500 controls the starter and generator clutch 250 to transfer the power of the engine 100 to the integrated starter and generator 200 (S520). When the power of the engine 100 is transferred to the integrated starter and generator 200 through the starter and generator clutch 250, the integrated starter and generator 200 generates power even by the power of the engine 100 to sufficiently charge the battery 60 (S530).

Figure 6:
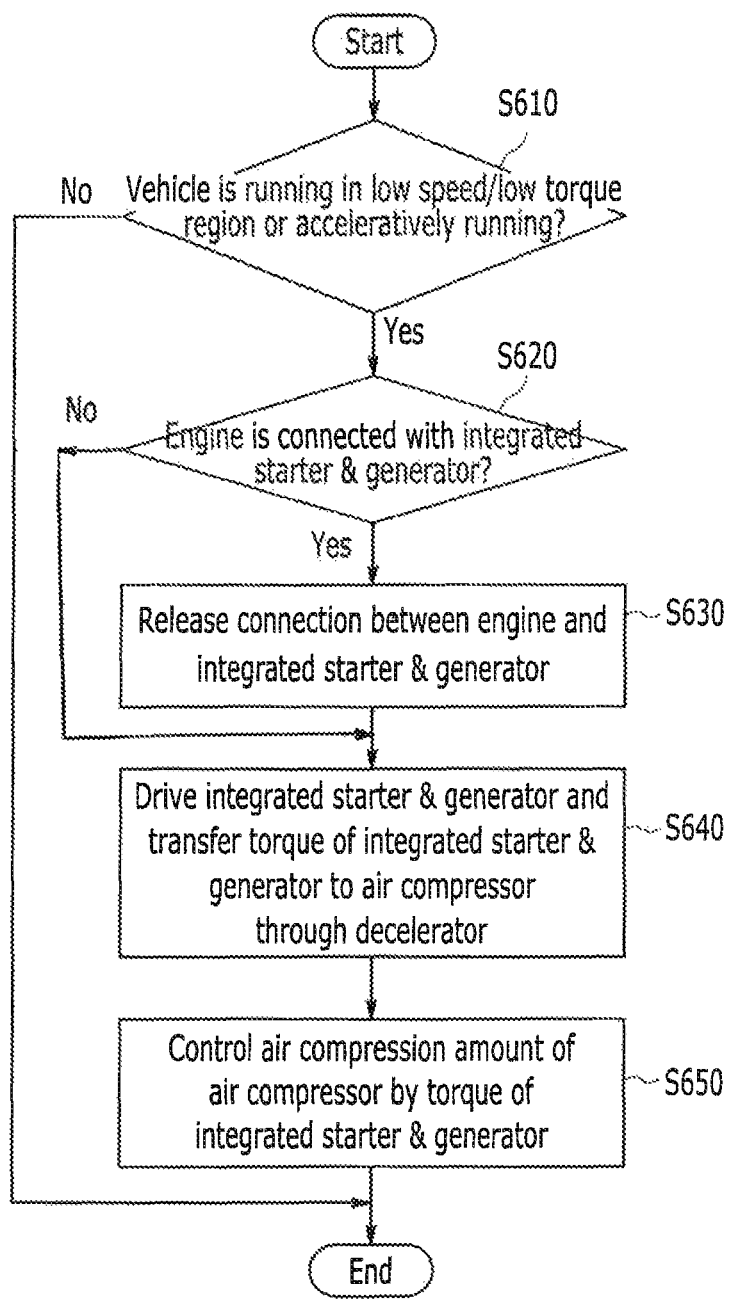

FIG. 6 is a flowchart illustrating a method of controlling driving applied to a case in which the hybrid electric vehicle according to the exemplary embodiment of the present invention runs in a low speeds/low torques or when accelerating. Referring to FIG. 6, the controller 500 identifies whether the hybrid electric vehicle is running in below a predetermined speed/predetermined torque or is accelerating (S610). The controller 500 may identify whether the hybrid electric vehicle is running below a predetermined speed/predetermined torque or is accelerating based on the state of the engine 100 or information within the engine control unit (ECU) (i.e., a separate controller) and an acceleration position sensor (APS).

When it is identified that the hybrid electric vehicle is running below a predetermined speed/predetermined torque or is accelerating, the controller 500 identifies whether the engine 100 is connected with the integrated starter and generator 200 by the starter and generator clutch 250 (S620). When the engine 100 is connected with the integrated starter and generator 200 by the starter and generator clutch 250, the controller 500 releases the connection between the engine 100 and the integrated starter and generator 200 by controlling the starter and generator clutch 250 (S630) accordingly.

When the connection between the engine 100 and the integrated starter and generator 200 is released, the controller 500 transfers the torque from the integrated starter and generator 200 to the air compressor 320 through the decelerator 400 by controlling the integrated starter and generator 200 (S640). When the torque of the integrated starter and generator 200 is transferred to the air compressor 320, the air compressor 320 further compresses air from the torque of the integrated starter and generator 200 to supply a larger amount of air to the engine 100 (S650). Accordingly, output of the engine 100 at low speeds (e.g., below 20 mph), efficiency at lower torques increases, and accelerative performance is improved during the acceleration. The controller 500 may control the torque of the integrated starter and generator 200 based on an output state of the engine 100 and a driving state of the hybrid electric vehicle.

Figure 7:
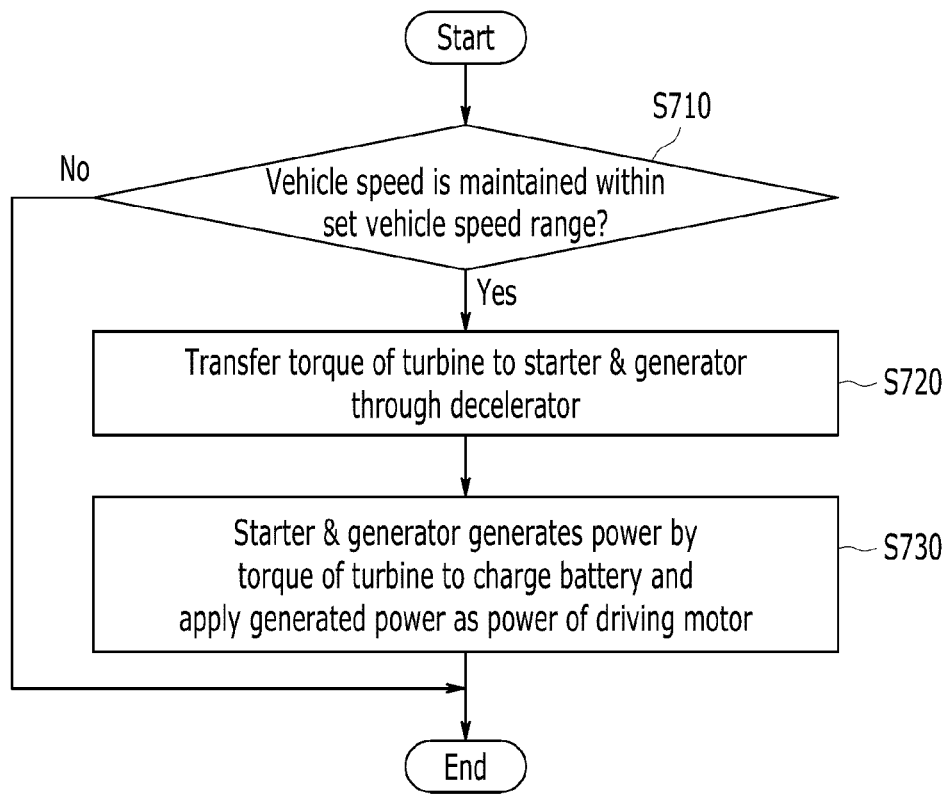

FIG. 7 is a flowchart illustrating a method of controlling driving applied to running at a fixed speed like a case in which the hybrid electric vehicle according to the exemplary embodiment of the present invention runs in an expressway. Referring to FIG. 7, when a speed of the hybrid electric vehicle is maintained within a set range, the controller 500 determines that the hybrid electric vehicle runs at a fixed speed (S710). When the vehicle runs at the fixed speed, the sufficient amount of exhaust gas is generally discharged. When the hybrid electric vehicle runs at the fixed speed and thus the sufficient amount of exhaust gas is discharged, the controller 500 transfers the torque of the turbine 310 rotated by the exhaust gas to the integrated starter and generator 200 through the decelerator 400 so that the integrated starter and generator 200 generates power (S720).

When the integrated starter and generator 200 generates the power, the controller 500 charges the battery 60 with the generated power of the integrated starter and generator 200 or applies the generated power from the integrated starter and generator 200 as driving power of the driving motor 20 through the battery 60 (S730). Accordingly, according to the exemplary embodiment of the present invention, the power is generated via energy from the exhaust gas sufficiently discharged while driving at a fixed speed and the driving motor is driven by the generated power, thereby improving fuel efficiency in a fixed-speed driving mode, such as while driving on an expressway.

Figure 8:
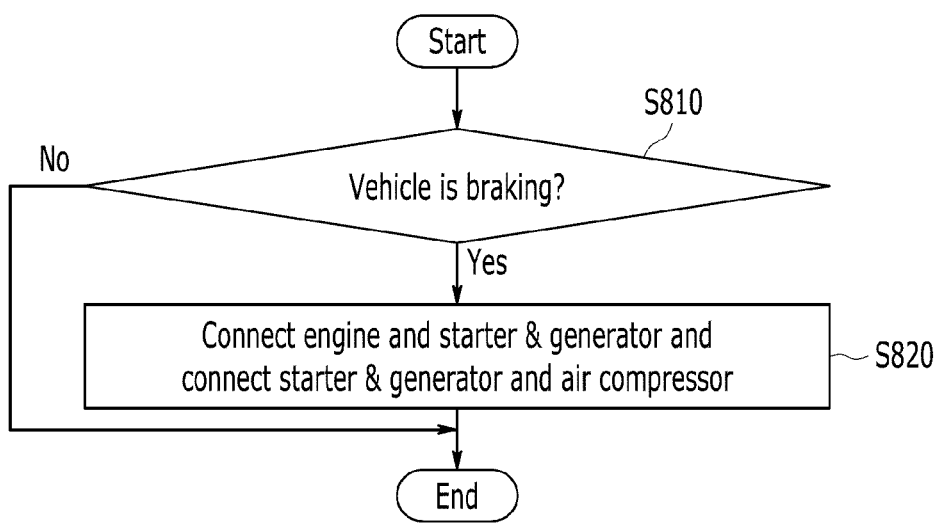

FIG. 8 is a flowchart illustrating a method of controlling driving applied to a case where the hybrid electric vehicle according to the exemplary embodiment of the present invention applies the brakes. Referring to FIG. 8, the controller 500 identifies whether the hybrid electric vehicle is braking (S810). The controller 500 may identify whether the hybrid electric vehicle is braking based on a signal of the brake position sensor (BPS). When the hybrid electric vehicle is braking, in order to improve braking power, the controller 500 connects the engine 100 and the integrated starter and generator 200 by controlling the starter and generator clutch 250 and connects/engages the integrated starter and generator 200 and the air compressor 320 by controlling the decelerator 400 (S820). Accordingly, the braking power of the hybrid electric vehicle according to the exemplary embodiment of the present invention is improved.

Figure 9:
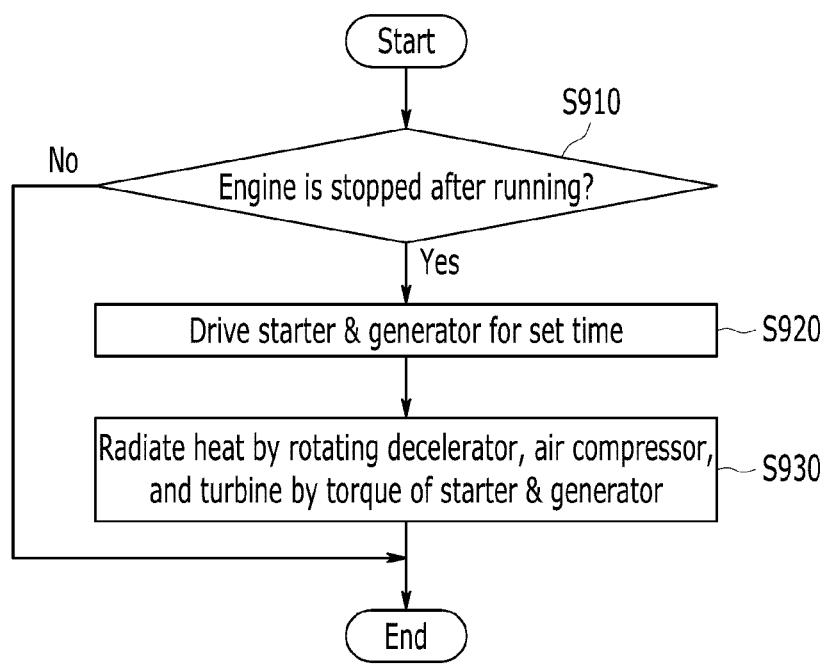

FIG. 9 is a flowchart illustrating a method of controlling driving applied to a case in which the hybrid electric vehicle according to the exemplary embodiment of the present invention terminates operation/running and the engine is stopped. Referring to FIG. 9, the controller 500 identifies whether the engine 100 is stopped after operation of the hybrid electric vehicle (S910). The controller 500 may identify whether the engine is stopped after the running of the hybrid electric vehicle based on a position signal of a starting key and revolutions per minute of the engine.

When the engine 100 is stopped after the running the hybrid electric vehicle, the controller 500 controls the decelerator 400, the turbine 310, and the air compressor 320 to be rotated by the torque of the integrated starter and generator 200 to radiate heat by rotating the integrated starter and generator 200 for a set period of time (S920 and S930).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 100: Engine | 200: Integrated starter and generator (ISG) |
| 250: Starter and generator clutch | 300: Turbocharger |
| 310: Turbine | 320: Air compressor |
| 400: Decelerator | 500: Controller |

What is claimed is:

1. A hybrid electric vehicle, comprising:
an engine configured to generate power by injecting fuel into the engine;
a driving motor configured to generate power via power from a battery;
an engine clutch positioned between the engine and the driving motor to engage and disengage the engine and the driving motor;
an integrated starter and generator (ISG) configured to start the engine or generate power;
a turbocharger including a turbine rotated via exhaust gas introduced in an exhaust manifold and an air compressor configured to compress air to transfer the compressed air to an air intake of the engine;
a decelerator configured to adjust revolution speeds and torque of the turbine and the air compressor of the turbocharger and the integrated starter and generator;
a controller configured to control the integrated starter and generator, the engine clutch, the turbocharger, and the decelerator based on states of the engine, the driving motor, and the battery; and
a starter and generator clutch configured to transfer power from the engine to the integrated starter and generator through a belt or block the transference of power from the engine to the integrated starter and generator,
wherein the controller is configured to transfer the torque of the integrated starter and generator to the air compressor of the turbocharger through the decelerator to rotate the air compressor while the engine is being started by the integrated starter and generator,
the controller controls the starter and generator clutch so that connection between the engine and the integrated starter and generator is blocked after the engine is started, and
the controller transfers the torque from the turbine to the integrated starter and generator through the decelerator and the integrated starter and generator generates power by the torque of the turbine while rotating when the battery needs to be charged.

2. The hybrid electric vehicle of claim 1, wherein:
the controller controls the starter and generator clutch so that the power from the engine is transferred to the integrated starter and generator and the power is generated by the power of the engine as well when the amount of generated power from the integrated starter and generator by the torque of the turbine is insufficient to charge the battery.

3. The hybrid electric vehicle of claim 1, wherein:
the controller disengages the starter and generator clutch between the engine and the integrated starter and generator, and controls the integrated starter and generator and the decelerator so that the torque of the integrated starter and generator is transferred to the air compressor through the decelerator and an amount of intake air supplied to the engine by the air compressor increases, when the hybrid electric vehicle runs below a predetermined speed/predetermined torque or is accelerating, and the engine is connected with the integrated starter and generator.

4. The hybrid electric vehicle of claim 1, wherein:
the controller transfers the torque of the turbine to the integrated starter and generator through the decelerator when the hybrid electric vehicle runs at a fixed speed and charges the battery by power generation of the integrated starter and generator.

5. The hybrid electric vehicle of claim 1, wherein:
the controller engages the engine and the integrated starter and generator and engages the integrated starter and generator and the air compressor through the decelerator while braking.

6. The hybrid electric vehicle of claim 1, wherein:
the controller rotates the integrated starter and generator for a set period of time to make the decelerator, the turbine, and the air compressor radiate heat when the engine is stopped after the hybrid electric vehicle stops running.

7. A method of controlling driving of a hybrid electric vehicle including an engine configured to generate power via injecting fuel in the engine, a driving motor configured to generate power via power from a battery; an engine clutch positioned between the engine and the driving motor to engage and disengage the engine and the driving motor; an integrated starter and generator, which serves as an integrated starter and generator for starting the engine or generating power, the integrated starter and generator including a starter and generator clutch configured to engage and disengage the integrated starter and generator and the engine, and a turbocharger including a turbine rotated via exhaust gas introduced in an exhaust manifold and an air compressor configured to compress air to transfer the compressed air to an air intake of the engine, the method comprising:

transferring, by a controller, torque of the integrated starter and generator to the air compressor of the turbocharger through a decelerator to rotate the air compressor while the engine is being started;

controlling, by the controller, the starter and generator clutch to disengage the connection between the engine and the integrated starter and generator after the engine is started;

transferring, through a belt of a starter and generator clutch, power from the engine to the integrated starter and generator or blocking the transference of power from the engine to the integrated starter and generator;

when the battery needs to be charged, transferring the torque from the turbine to the integrated starter and generator through the decelerator and forcing the integrated starter and generator to rotate via the torque of the turbine to generate power;

when the amount of generated power of the integrated starter and generator by the torque of the turbine is insufficient to charge the battery, transferring the power of the engine to the integrated starter and generator so that power is generated via power from the engine by controlling the starter and generator clutch accordingly;

when the hybrid electric vehicle runs below a predetermined speed/predetermined torque or is accelerating, and the engine is connected with the integrated starter and generator, disengaging the connection between the engine and the integrated starter and generator; and controlling the integrated starter and generator and the decelerator so that the torque from the integrated starter and generator is transferred to the air compressor through the decelerator to increase an amount of intake air supplied to the engine by the air compressor.

8. The method of claim 7, wherein:

transferring the torque from the turbine to the integrated starter and generator through the decelerator if the hybrid electric vehicle is running at a fixed speed and the battery is charged by power generation from the integrated starter and generator.

9. The method of claim 7, further comprising:

engaging the engine with the integrated starter and generator and connecting the integrated starter and generator with the air compressor through the decelerator when the hybrid electric vehicle brakes; and controlling the decelerator, the turbine, and the air compressor to radiate heat via the torque of the integrated starter and generator by rotating the integrated starter and generator for a set period of time while the engine is stopped.

\* \* \* \* \*